Oct. 4, 1932.  C. R. BRATTON ET AL  1,881,118
INCUBATOR
Filed March 1, 1930  3 Sheets-Sheet 1
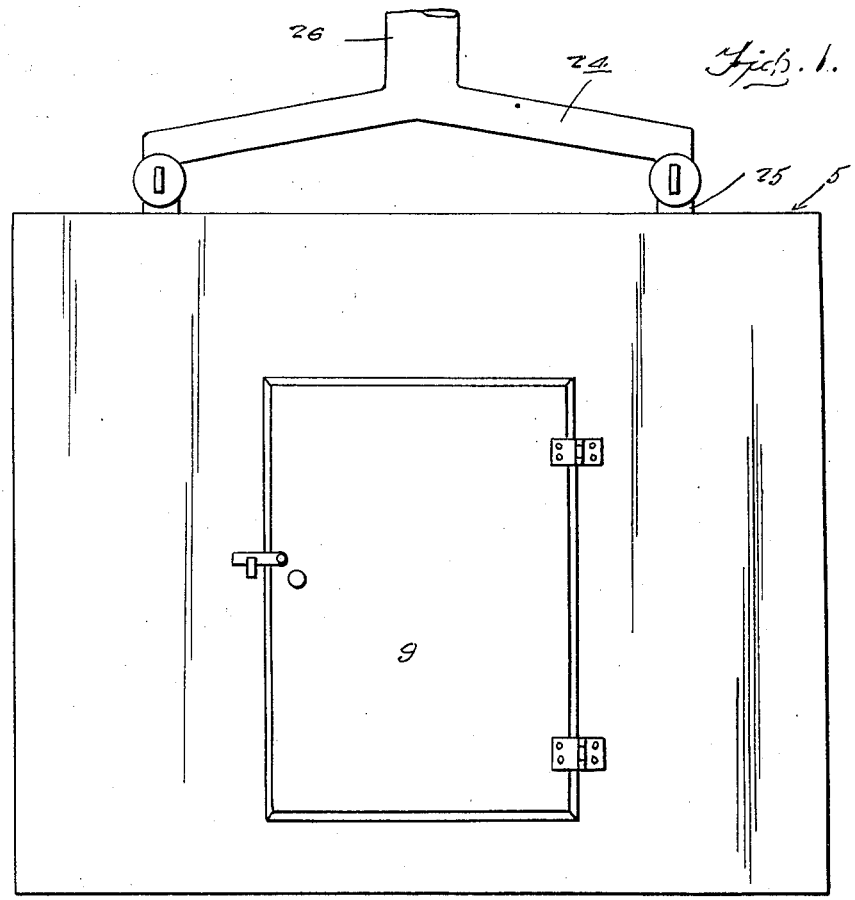
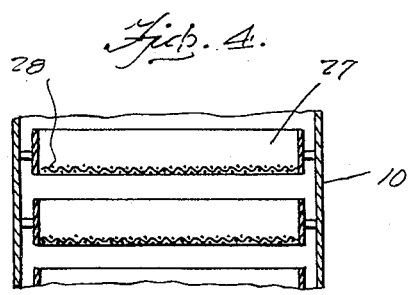
Inventors
C. R. Bratton
C. S. Miner
By Clarence A. O'Brien
Attorney

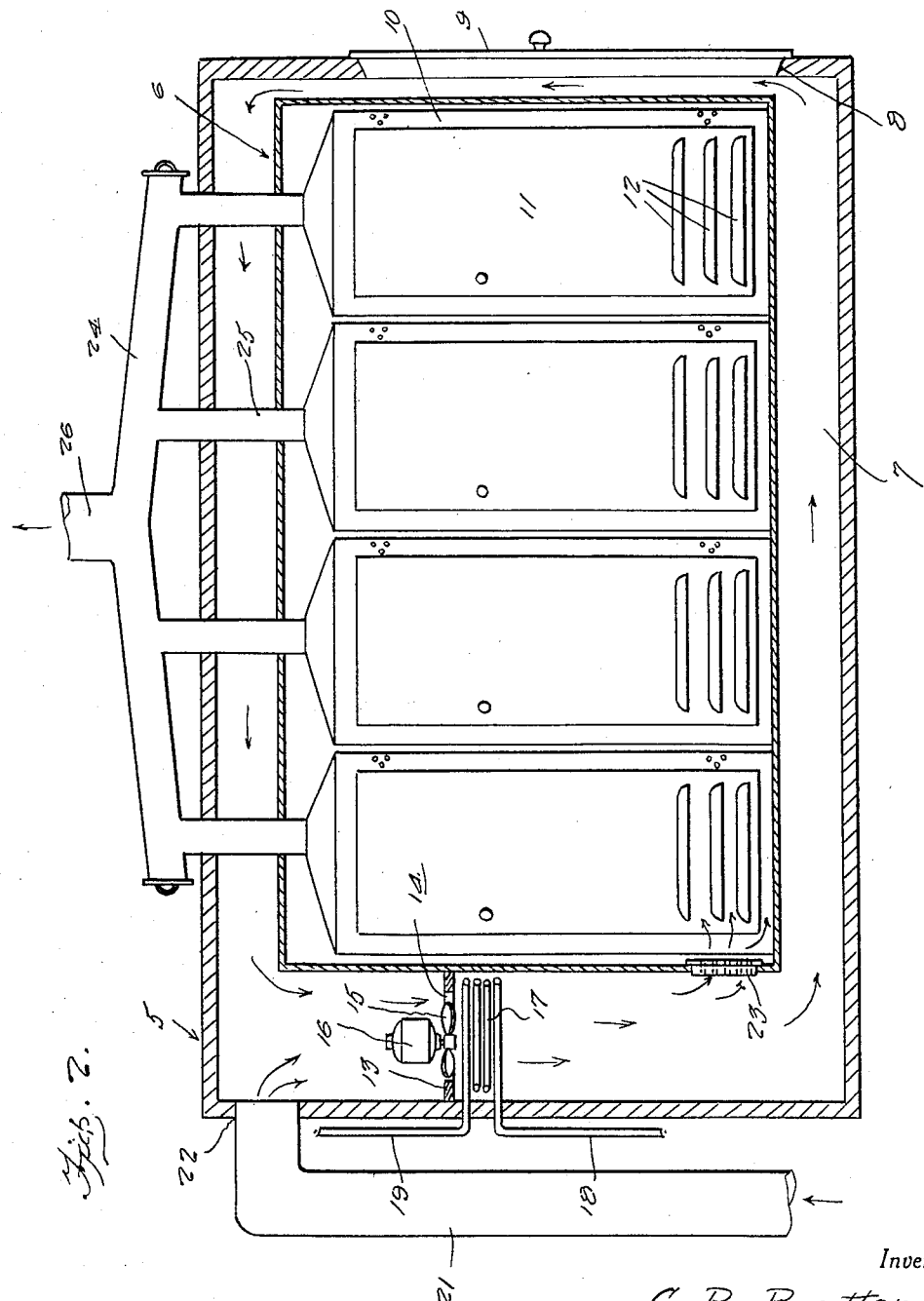

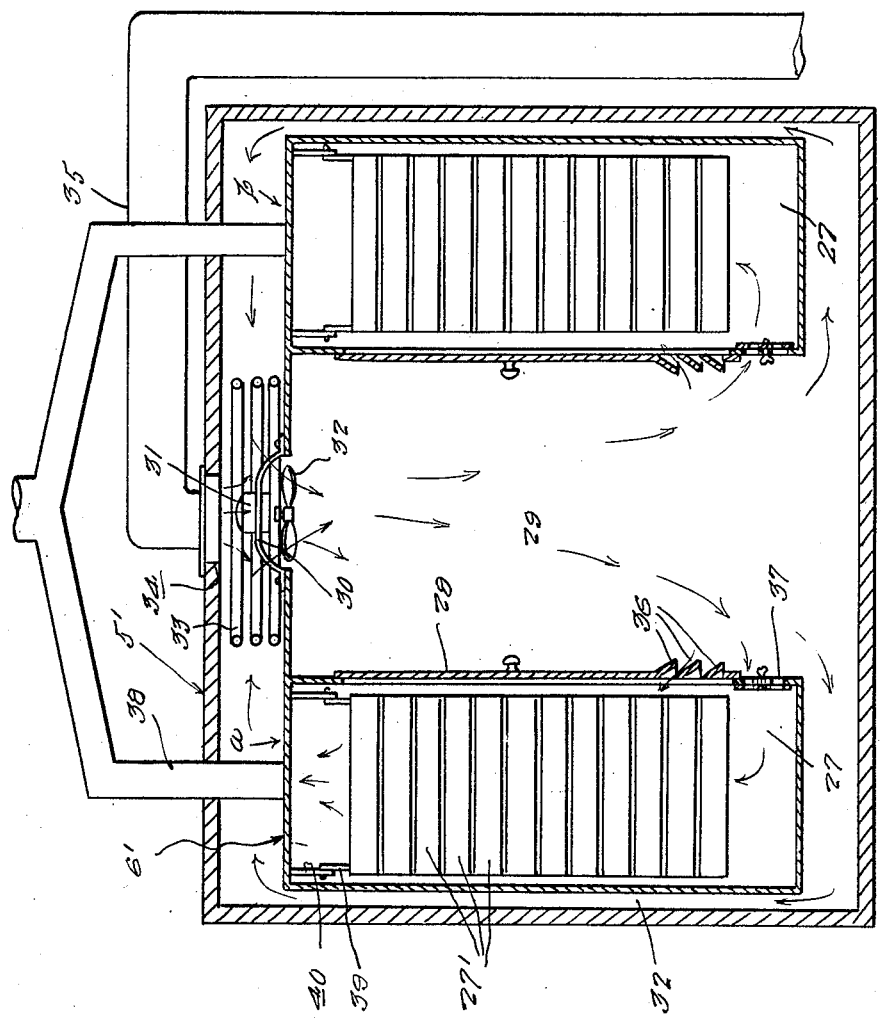

Patented Oct. 4, 1932

1,881,118

UNITED STATES PATENT OFFICE

CLAIR R. BRATTON AND CECIL S. MINER, OF BURLINGAME, KANSAS

INCUBATOR

Application filed March 1, 1930. Serial No. 432,433.

This invention relates to improvements in incubators.

The primary object of this invention is to provide an incubator of large capacity and of such construction and arrangement and so equipped as to maintain a temperature of uniform degree within an inner casing equipped with a plurality of hatching tray compartments, and at all points in the inner chamber without the use of mechanical means to stir the air in the inner chamber.

A further object of this invention is to so evolve an incubator wherein a plurality of chambers in which hatching trays are arranged will have a uniform temperature, when a sufficient quantity of air is circulated between inner and outer casings to carry enough heat units to offset the difference in temperature within and without the outside casing.

A still further object of the invention is to provide an incubator of the character above mentioned, which is comparatively simple in construction, thoroughly reliable, practical and efficient in operation and otherwise well adapted for the purpose designed.

Other objects and advantages of the invention will become apparent during a study of the following description, taken in connection with the accompanying drawings, wherein:—

Figure 1 is a front elevational view of the preferred form of the invention.

Figure 2 is a vertical longitudinal sectional view taken therethrough.

Figure 3 is a transverse sectional view taken through a modified form of the invention.

Figure 4 is a fragmentary detail sectional view illustrative of the manner of arranging the egg trays within individual compartments which the incubator comprises.

With reference more in detail to the drawings, and more particularly to Figures 1 and 2, it will be seen that the embodiment of the invention therein illustrated, comprises a relatively large outer casing 5 which outer casing 5 is constructed from any suitable insulating material. Arranged within the outer casing 5 is an inner casing designated generally by the reference character 6. The inner casing 6 may be mounted within the outer casing 5 in any suitable manner, and said inner casing 6 has all the walls thereof disposed in spaced relation to the corresponding walls of the outer casing 5 so as to provide between said inner and outer casings an air circulating passage 7. At one end the outer casing 5 is provided with a suitable entrance opening 8, and a suitably hinged door 9 is provided for closing the opening.

It is also to be noted that the inner casing 6 is preferably constructed of metal being somewhat in the nature of a shell.

Arranged within the inner casing 5 preferably in series or rows are a plurality of individual egg chambers designated generally by the reference character 10. The egg chambers 10 are identical in construction each being equipped with a suitable hinged door 11, the door 11 at the lower portion thereof being provided with a series of transversely extending louvres or vent openings 12.

Arranged in the space 7 between the rear walls of the inner and outer casings is a horizontal partition or platform 13 having an opening 14 formed therein. Operable within the opening 14 is a fan 15 driven from a suitable electric motor 16 suitably mounted above the partition 13. Arranged below the partition 13 is a steam circulating coil 17 the inlet and outlet 18 and 19, respectively, thereof being disposed exteriorly of the outer casing 5 as clearly shown to advantage in Figure 2. A cold air inlet pipe 21 has its discharge end arranged in a suitable opening 22 in the rear wall of the outer casing directly above the platform 13 so that as indicated by the arrows cold air entering into the space 7 from the intake pipe 17 will be drawn downwardly through the opening 14 to circulate within the outer casing 5 entirely about the casing 6. At one end thereof, and adjacent the bottom thereof the casing 6 is provided with a suitable perforated plug 23 through the perforations of which hot air enters the inner casing 6.

Obviously the heated air passing into the inner casing 6 will also pass into the openings 12 in the doors 11 of the compartments 10 to circulate within each of the compartments 10.

Exteriorly of the casing is an exhaust manifold pipe 24 having branches 25 leading therefrom to the compartments 10 so that obviously the heated air circulating upwardly through each of the compartments 10 will pass out of the branch 25 leading to the compartment into the manifold 24 to be exhausted through the outlet 26 of the manifold. Arranged within each of the compartments 10 is a series of superimposed spaced trays 27 within which the eggs to be hatched are deposited. Each of the trays 27 will, of course, have a screening or wire mesh bottom 28.

From the foregoing then it will be seen that the air heated through contact with the coil 17 will be agitated to flow through the passage 7 through the medium of the fan 15 but that the heated air circulating within the inner casing 6 and through the individual egg receiving compartments 10 will not in any way be stirred up or agitated by mechanical means arranged either in the inner casing 6 or in the individual compartments 10. However, as is obvious, the heated air within the casing 6 and the individual compartments 10 will remain at an even temperature, so that the temperature within each of the compartments 10 will be substantially the same.

In that embodiments of the invention shown in Figure 3 it will be seen that I have designated the outer insulated casing generally by the reference character 5' and within the outer casing 5' is disposed an inner casing designated generally by the reference character 6', in this instance the inner casing 6' comprising a pair of sections *a* and *b*, respectively, the sections being preferably separate but of identical construction. As shown to advantage, the sections extend in spaced parallelism to one another and in spaced relation to the walls of the outer casing 5'. Each of the sections *a* and *b* may be in the nature of a single egg receiving compartment, or as is obvious through the medium of vertically arranged spaced partitions may be divided into a plurality of egg receiving compartments. The compartments are designated generally by the reference character 27, access being had to the compartments through suitable hinged doors 28 by one standing in the space 29 between the casing sections *a* and *b*.

The top walls of the sections are extended inwardly across the front of the space 29 to terminate in spaced parallelism with one another as clearly suggested in Figure 3. Bridging the space between the top walls of the sections *a* and *b* and having its ends secured to the section walls, is a bracket 30, which bracket 30 supports a suitable electric motor 31 which operates a fan 32 carried thereby and extending between the adjacent edges of the top walls of the sections *a* and *b*.

Of course, the casing 6' is spaced at all points from the outer casing 5' forming therebetween a hot air passage 32. Arranged in the passage 32 between the top wall of the casing 6' and the top wall of the casing 5' adjacent the motor 31 is a steam coil 33.

The top wall of the outer casing 5' above the coil 33 is provided with a cold air intake opening 34 within which opening is received the flanged end of a cold air intake pipe 35. The doors 28 of the compartments 27 at the lower ends thereof are provided with air inlet openings or louvres 36, while below the lower ends of the doors 28 adjacent the bottom walls of the compartments 27 are provided valve controlled air inlet ports 37. A vent or exhaust manifold has branches 38 thereof connected to the top walls of compartments 27.

Of course, arranged within each compartment 27 will be a series of egg receiving trays 27', the trays 27' of the respective series being suitably arranged in superimposed relation and suitably connected one to the other. The uppermost tray of each series at the ends thereof will be provided with suitable suspension hooks 39, or similar suspension elements for engagement with hangers 40 depending from the top wall of the compartment 27.

In operation, it will be seen that as in the first embodiment of the invention, the cold air entering the space 32 will be heated by contact with the steam coil 33 and circulated through the passage 22, the heated air exterior of the compartment 27 being agitated by the fan 32 while the air passing upwardly and about the trays 27' within the compartments 27 will have no such mechanical means effecting its circulation, the heated air within the compartments 27 following the usual course rising upwardly to exhaust through the manifold hereinbefore mentioned.

From the foregoing, it is thought that a clear understanding of the operation, construction, utility and advantages of incubators of this character will be had by those skilled in the art without a more detailed description.

Having thus described our invention what we claim as new is:—

In an incubator, an outer casing having walls, an inner casing within the outer casing, and having all sides thereof spaced from the walls of said outer casing thereby defining a chamber completely surrounding the inner casing, a plurality of separate egg receiving compartments within the inner casing, an air inlet means connected to the upper portion of the outer casing and communicating with said chamber, a fan arranged adjacent said air inlet means and having a blowing element to induce a circulation of air through said chamber and about all the sides of said inner casing, said inner casing being provided with means establishing communication between said inner casing and said chamber, and an exhaust manifold having branches separately connected to said egg receiving compartments, said egg receiving compartments being provided with inlet means for the admission of the air admitted to the inner casing.

In testimony whereof we affix our signatures.

CLAIR R. BRATTON.
CECIL S. MINER.